Oct. 25, 1960
R. E. DAVY
2,957,548
MERCHANDISING MART
Filed April 21, 1958
6 Sheets-Sheet 3
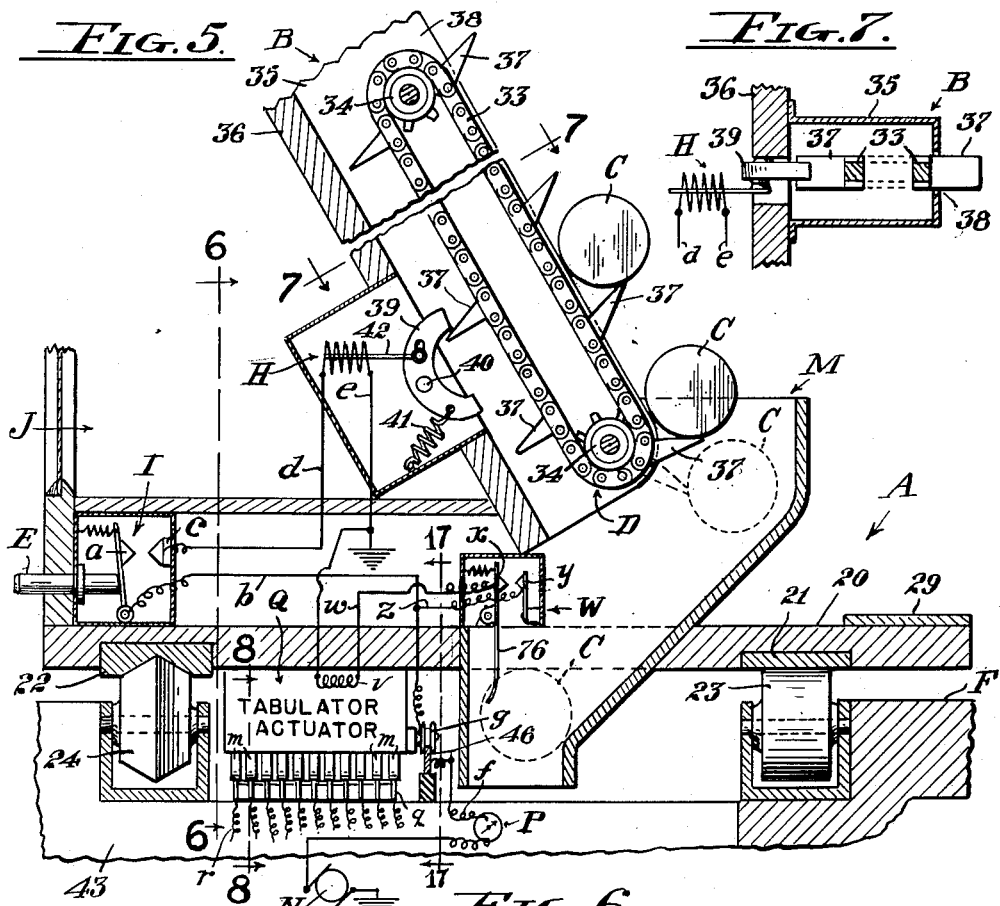
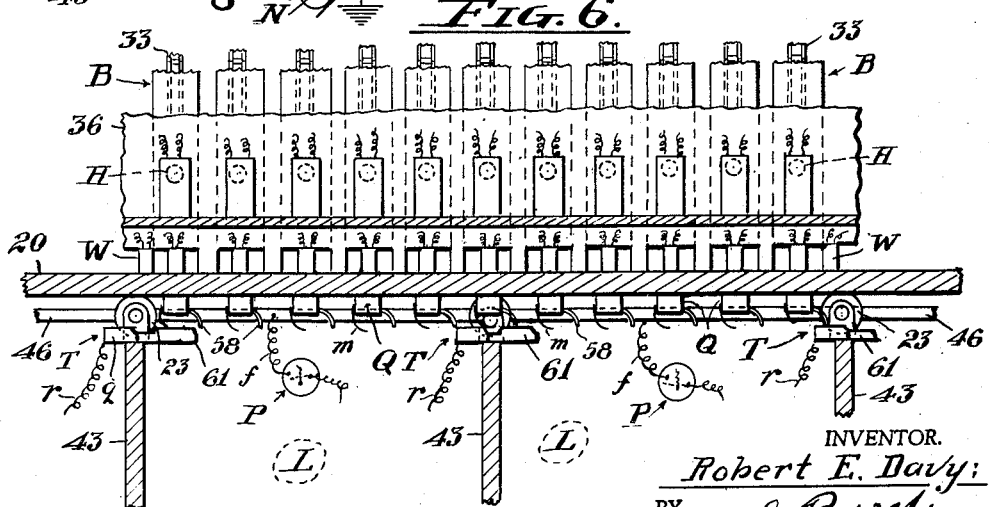
INVENTOR.
Robert E. Davy;
BY
R. S. Berry
Atty.

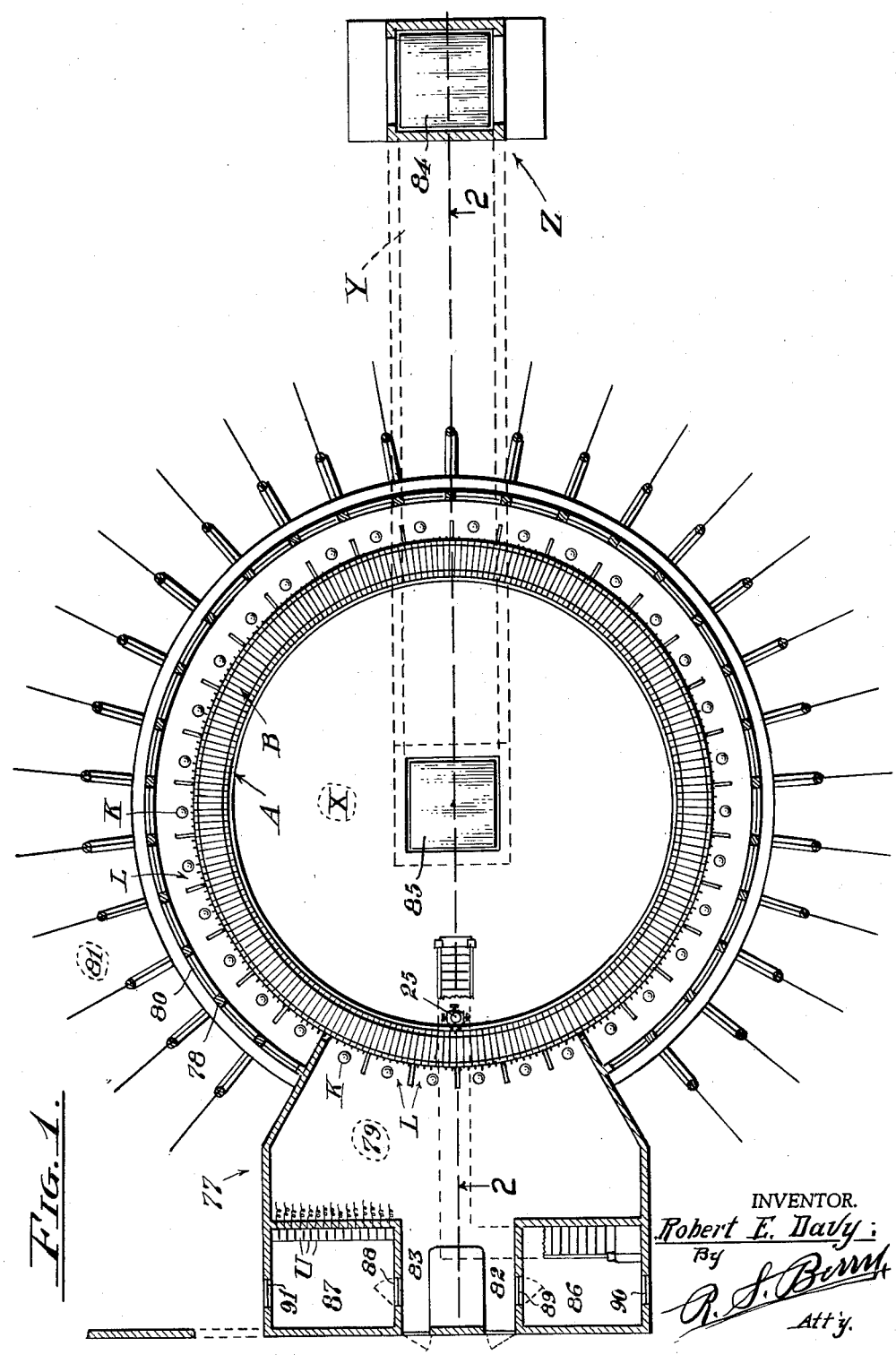

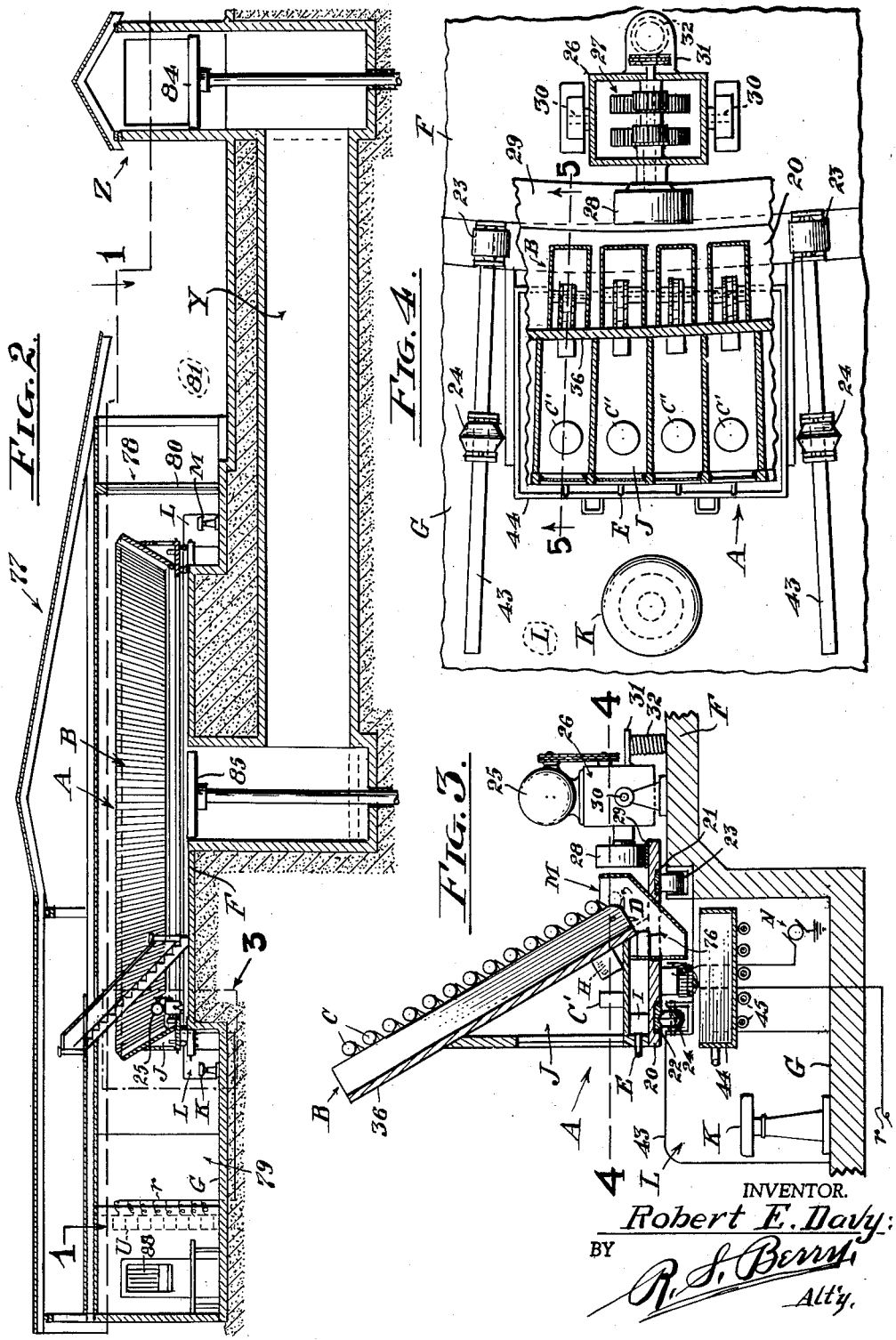

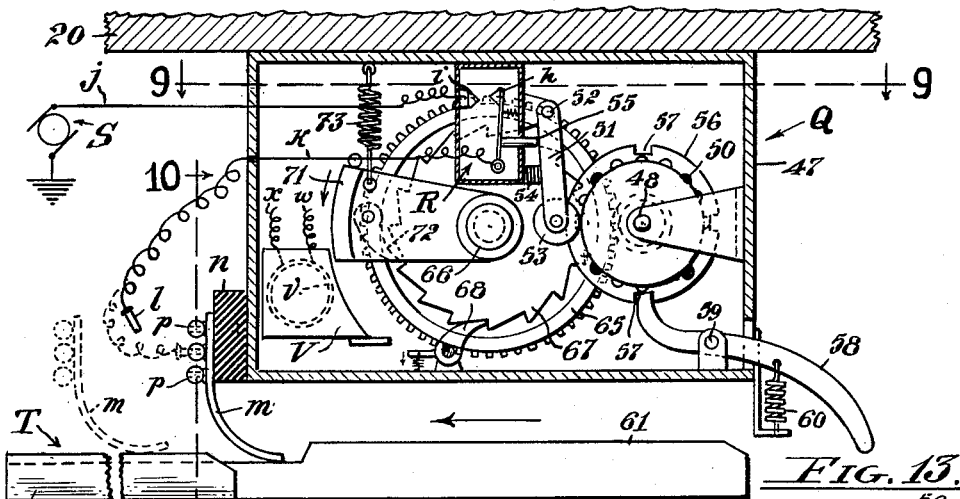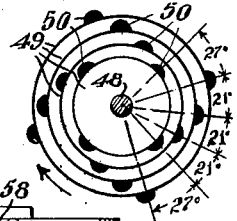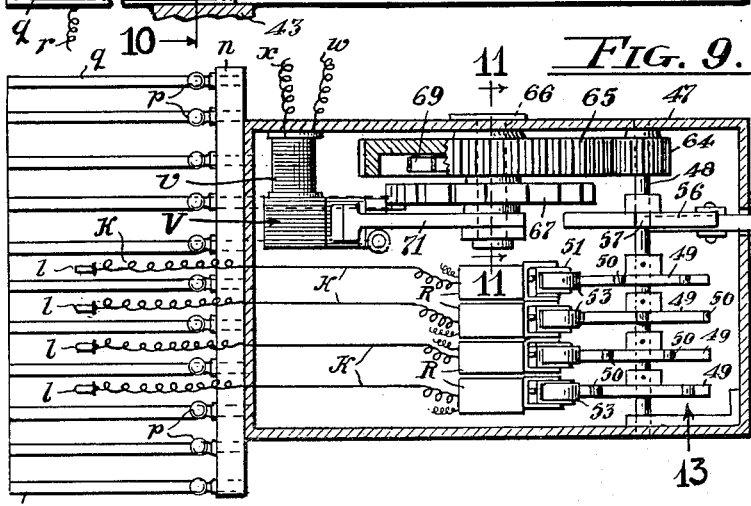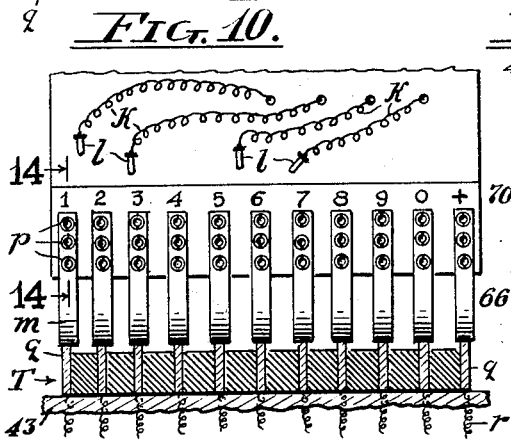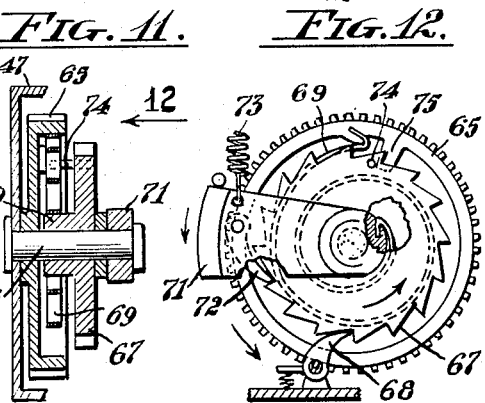

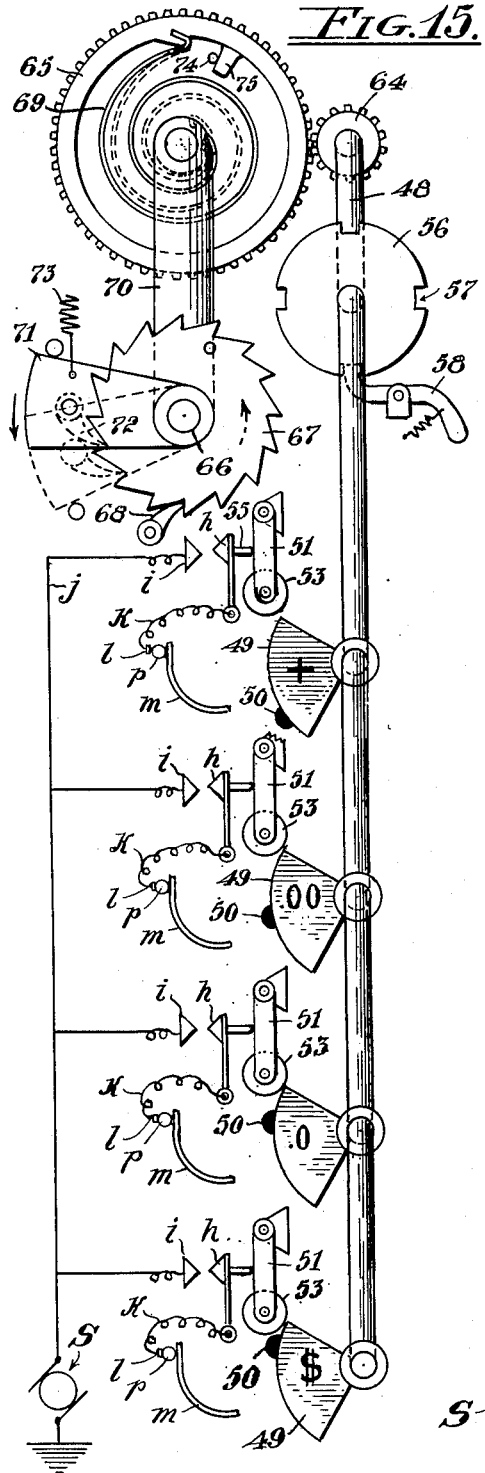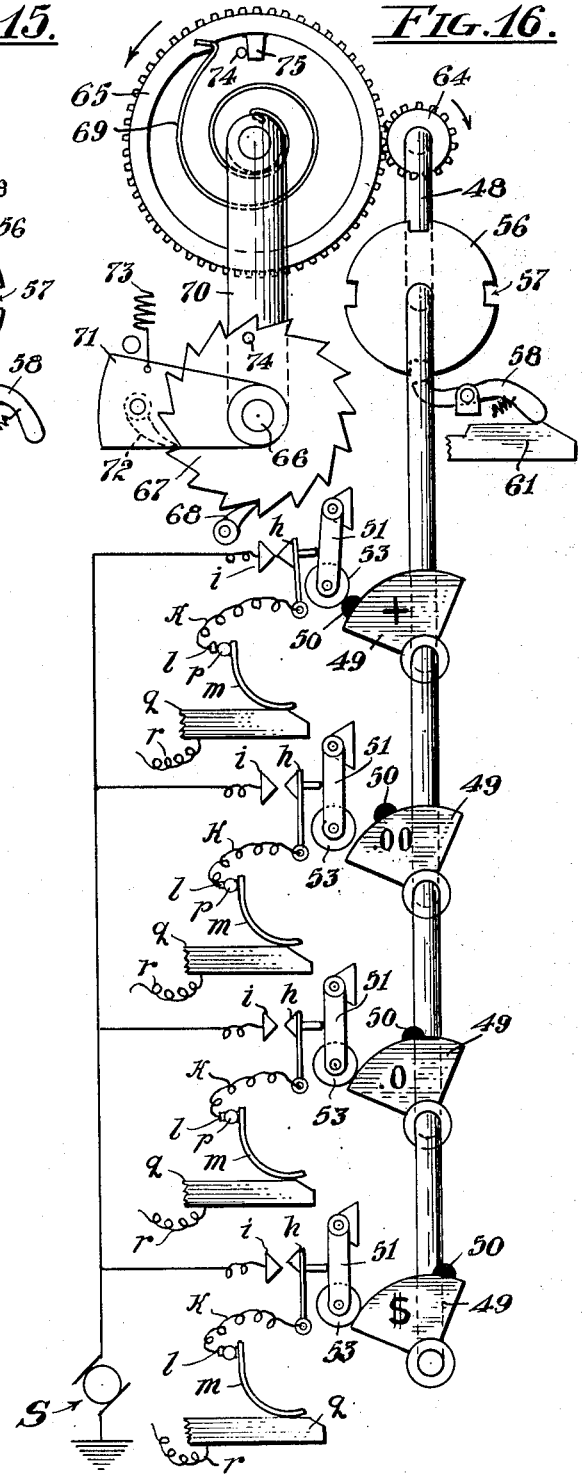

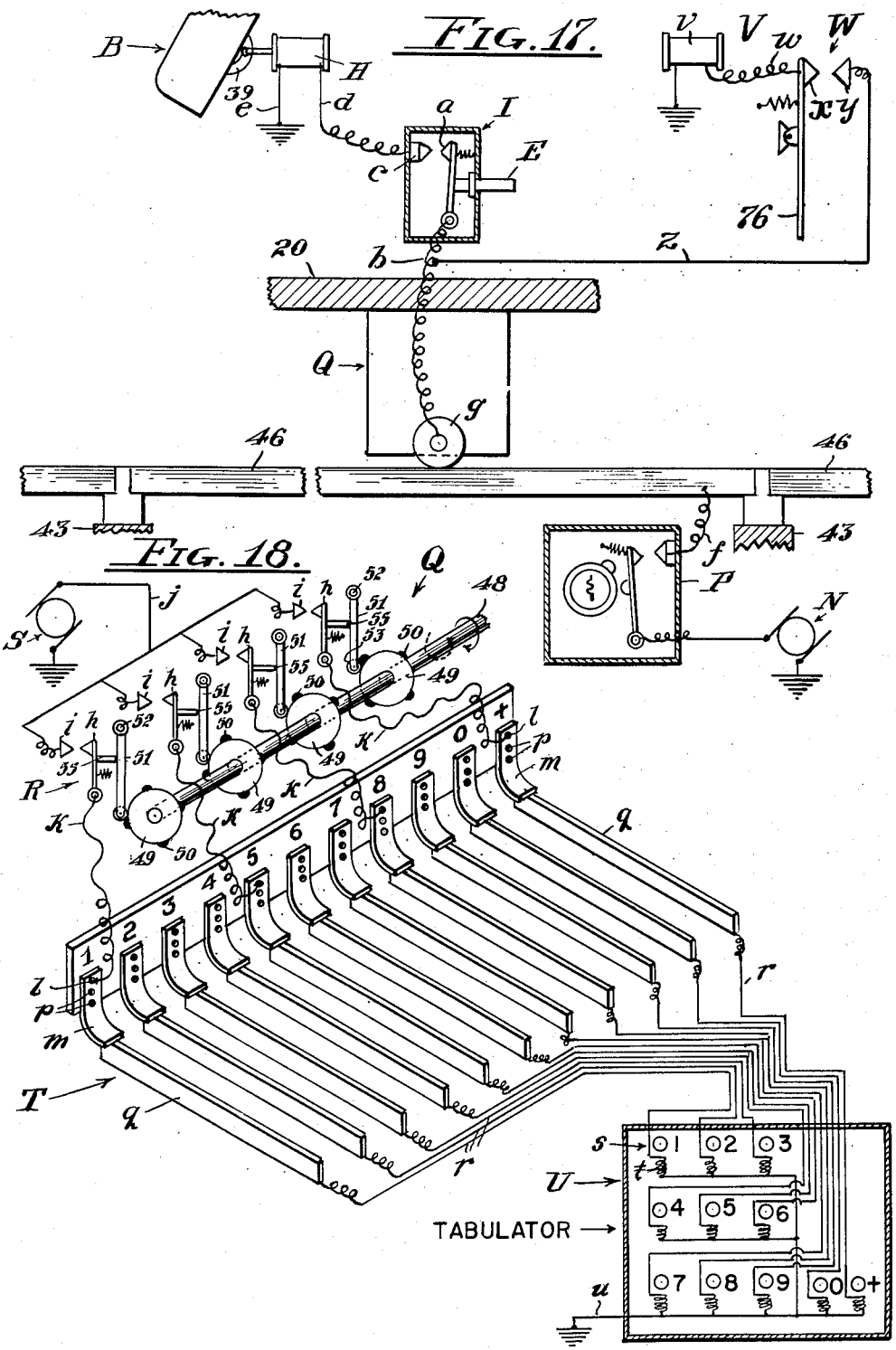

United States Patent Office 2,957,548
Patented Oct. 25, 1960

2,957,548

MERCHANDISING MART

Robert E. Davy, 2065 Flora Lemon Grove,
San Diego, Calif.

Filed Apr. 21, 1958, Ser. No. 729,850

17 Claims. (Cl. 186—1)

This invention relates to a merchandising mart and has as its primary object the provision of means for facilitating the marketing of various products such as are ordinarily retailed in drive-in markets.

Such markets as now generally constructed and operated usually involve a store building wherein merchandise is arranged for access by the customers who serve themselves and thereafter present the selected goods to a combined checking clerk and cashier who consumates the sale by totaling the amount of a purchase, receiving payment thereof, and delivering the purchase to the customer, sometimes with the aid of a helper. On entering the market and selecting purchases the customer walks to the place where the wanted goods are located, which frequently necessitates considerable walking and is time consuming, particularly where a large variety of items is being selected and where difficulty is encountered in finding the desired items. This mode of merchandising also ordinarily involves the mingling with the customers of stock clerks employed in replacing the goods removed by the customers which occasions interference and consequent delay for both the customer and clerks. Patronage of such markets by a customer traveling to the market by motor vehicle necessitates first parking the vehicle, then walking therefrom to the market which in many instances requires traversing a distance of several hundred feet.

A particular object of the invention is to provide a merchandising mart embodying constructions and arrangements whereby customers are relieved of the necessity of walking more than a few steps within the market which is accomplished by bringing the goods to the customer rather than requiring the customer to go to the goods as now practiced, and whereby if desired, the customer may be seated during the marketing operation, such object being accomplished generally by the provision of a powered horizontally extending rotary annular conveyor equipped with a multiple of manually controlled merchandise dispensing units, which conveyor is surrounded contiguous thereto by a multiple of booths adapted to accommodate customers, whereby merchandise on the dispensing units is presented to and may be selected by and dispensed to a customer in a booth as the conveyor advances.

Another object of the invention is to provide means whereby only the dispensing units passing a booth as the conveyor advances may be operated by the occupant of such booth and wherein such operation is key controlled so that actuation of the dispensing units can be effected only by an authorized person possessing a key assigned to a particular booth.

Another object is to provide a mechanism whereby an item of merchandise delivered by a dispensing unit may be automatically indicated on a tabulator and the selling price of the item recorded, including an individual tabulator actuator associated with each dispensing unit embodying a price indicator which may be readily set to indicate various prices.

As a means for facilitating patronage of the mart by persons traveling by motor vehicles, each of the booths has an adjoining individual auto-parking area whereby the vehicle may be parked in close proximity to a booth thus minimizing the distance required to be walked by the customer forth and back between the vehicle and the marketing station defined by a booth.

Another object is to provide a construction and arrangement whereby the stock of commodities presented to customers for selection and purchase may be rapidly replenished as dispensed or depleted during merchandising operations without mingling of stock clerks and customers, which is accomplished by providing dispensing units on the conveyor which are adapted to be stocked from the inner side of the conveyor apart from the customers and while the conveyor is in motion, and which operation is facilitated by utilizing the area within the annular conveyor as a warehouse or storage space from which the merchandise may be taken as needed and quickly placed in the units in readiness for dispensing.

Among the advantages attained by the use of the invention is economy of market space relative to the volume of goods distributed and persons served, the rapidity and convenience with which marketing may be accomplished both on the part of the customer and the market personnel, minimizing loss of merchandise by theft, and possible increased volume of business relative to the number of persons employed in operating the market.

With the foregoing objects in view, together with such other objects and advantages as may subsequently appear, the invention resides in the parts and in the combination, construction and arrangement of parts hereinafter described and claimed, and illustrated by way of example in the accompanying drawings in which:

Fig. 1 is a diagrammatic horizontal section and plan view of the merchandising mart with portions removed as seen on the line 1—1 of Fig. 2;

Fig. 2 is a view in vertical section taken on the line 2—2 of Fig. 1;

Fig. 3 is an enlarged detail in section of the portion of the structure defined by the broken line rectangle indicated at 3 in Fig. 2;

Fig. 4 is a view in horizontal section and plan taken on the line 4—4 of Fig. 3 showing a fragmentary portion of a rotary annular conveyor with a plurality of adjoining dispensing units and associated display cases thereon, depicting the conveyor mounting and driving mechanism and further showing the arrangement of a customer booth in its relation to the conveyor;

Fig. 5 is a view in vertical section partly in elevation as seen on the line 5—5 of Fig. 4 with portions broken away illustrating the mounting of the conveyor and the arrangement of a merchandise dispensing unit and its associated tabulator actuator carried by the conveyor and depicting diagrammatically the electro-mechanical devices and electrical circuit controlling same associated with the dispensing unit and the tabulator actuator;

Fig. 6 is a view in section and elevation on a reduced scale as seen on the line 6—6 of Fig. 5;

Fig. 7 is a detail in horizontal section taken on the line 7—7 of Fig. 5;

Fig. 8 is an enlarged view in section and elevation of the tabulator actuator as seen on the line 8—8 of Fig. 5;

Fig. 9 is a horizontal section and plan view taken on the line 9—9 of Fig. 8;

Fig. 10 is a view in section and elevation as seen on the line 10—10 of Fig. 8;

Fig. 11 is a view in section taken on the line 11—11 of Fig. 9;

Fig. 12 is a view in elevation with portions broken away of the structure shown in Fig. 11 as indicated by the arrow 12;

Fig. 13 is a schematic diagram of the switch operating rotor indicated by the arrow 13 in Fig. 9;

Fig. 14 is a detail in section taken on the line 14—14 of Fig. 10;

Figs. 15 and 16 are schematic diagrams illustrating the mode of operation of the tabulator actuator shown in Figs. 8–13;

Fig. 17 is a diagram of the electro-mechanical devices and the electric circuits actuating same for controlling a dispensing unit and a tabulator actuator; and Fig. 18 is a diagram of the tabulator actuator in association with a tabulator and depicting the electrical circuits involved in same.

Referring to the drawings more specifically A indicates generally a horizontally extending revolubly mounted annular conveyor embodying a bed 20 fitted on its under side with a pair of spaced inner and outer concentric rails 21—22. The rails are seated on a series of circularly arranged pairs of radially spaced rollers 23—24 whereby the conveyor is mounted for circumferential rotation. At least one of the rails has a channel on its underside to extend astride its associated rollers and thereby hold the bed against lateral movement on the roller. To this end, as here shown, the outer rail 22 has a V-channel and the rollers 24 are tapered to conform thereto.

Any suitable conventional driving means may be employed in effecting movement of the conveyor A on the rollers 23—24. The means here shown comprises an electric motor 25 disposed on a tiltable support 26 adjacent the inner margin of the conveyor, the drive shaft of which motor is geared through a suitable transmission mechanism 27 carried in the support 26 to a driving wheel 28 frictionally engaged with a circular track 29 fixedly mounted on the conveyor bed and extending along its inner margin. The motor support 26 is carried on pivots 30 and is fitted on the side thereof opposite the driving wheel 28 with a flange 31 against the underside of which bears a thrust spring 32 which acts through the motor support 26 to cause the wheel 28 to bear on the track 29 under pressure such as to insure frictional driving engagement between the wheel and track. A multiple of such driving means may be employed.

Mounted on the conveyor bed 20 is a multiple of upstanding article dispensing units B adapted to carry items C of merchandise to be marketed. Each of the dispensing units B is designed to be loaded with a multiple of corresponding items C and each dispensing unit embodies a suitable dispensing mechanism indicated generally at D and which dispensing mechanism is controlled by a manually operated push button E as will be later described.

As here shown each of the dispensing units B embodies an endless sprocket chain 33 extending at an angle relative to the horizontal and carried for free rotation on a pair of sprocket wheels 34—34 mounted for free rotation in a chain housing 35 carried on a wall 36 extending outwardly from the conveyor bed 20 and co-extensive therewith; the housing 35 being mounted on the side of the wall 36 presented interially of the conveyor. Mounted on the sprocket chain 33 is a series of outwardly projecting fingers 37 which are arranged to project from the outer run of the chain through a slot 38 in the outer wall of the housing 35 and extending longitudinally of the latter opposite the outer run of the sprocket chain 33. The outwardly extending fingers 37 are adapted to loosely support the items C to be dispensed.

The sprocket chain 33 by reason of being upwardly extended is subject to being rotated by the weight of the items C carried on the fingers 37, manually controlled means being provided to hold the chain against movement in opposition to the load of the items C thereon which means is designed to be operated to momentarily disengage the chain 33 to allow downward movement of the outer run of the chain such distance as to move the lowermost fingers 37 on the upper run of the chain from beneath the item C imposed thereon thereby releasing the item and effecting its delivery from the dispensing unit. The dispensing control mechanism is here shown as embodying an oscillating double ended pawl 39 pivoted at 40 and arranged so that on oscillation thereof its ends will be positioned alternately in the paths of travel of adjacent fingers 37 on the lower run of the chain 33, the pawl 39 thus acting as an escapement controlling movement of the chain 33 intermittently step by step under the urge of the load of the items C such that the items will be discharged from the dispensing unit one at a time.

A spring 41 is connected to the pawl 39 and is arranged to exert a pull thereon such as to normally maintain one end of the pawl in engagement with, or in the path of travel of a leading finger 37, while the other end of the pawl is disposed out of the path of travel of the succeeding finger 37, as particularly shown in Fig. 5.

Connecting with the end portion of the pawl 39 opposite that engaged by the string 41 is the core 42 of a solenoid magnet H arranged in an electrical circuit equipped with a normally open switch I controlled by the push button E; the switch I embodying a movable contact member A connecting with an electrtical conductor $b$ leading from a source of electrical supply, as will be later described. The switch I also embodies a contact member $c$ from which a conductor $d$ leads to one terminal of the magnet H the other terminal of which is connected to a conductor $e$ leading to ground. The circuit above referred to and switch I is shown in Fig. 17.

Each of the dispensing units B has associated therewith an outwardly presented windowed display case J containing an itiem C' corresponding to the item in the related dispensing unit. The items C are supplied to the dispensing units B from the inner sides thereof, while selection of such items by the customers and the manual control of the dispensing units is effected from the outer side of the conveyor. To facilitate stocking the dispensing units B with the items C the floor F, which occupies the space surrounded by the conveyor A, is disposed at least substantially on a plane with the conveyor bed 20 from adjacent the inner margin thereof, while in order to facilitate selection of goods and operation of the dispensing units by the customers, a floor G is located exteriorly of the conveyor but preferably extending therebeneath, which floor is on a plane spaced several feet below the conveyor bed and in such relation to the display case J that the latter will be near the eye level of the person standing on the floor G, or occupying a seat K, facing the outer side of the conveyor contiguous thereto.

In order to avoid confusion of customers and also enable systemizing operation of the mart, a series of radially extending outwardly opening booths L lead from the outer side of the conveyor A within each of which is preferably located a seat K. Adjacent booths are separated by partitions 43. The booths are preferably dimensioned to comfortably accommodate a customer. The inner end of each booth L is equipped with a delivery chute M leading downwardly from beneath the conveyor bed 20 from the lower end of each dispensing unit and opening to a drawer 44 disposed beneath the under side of the conveyor for the reception of items delivered from the dispensing units B; the drawers 44 being carried on rollers 45 whereby they may be readily disposed beneath the chute and also withdrawn for removal therefrom of the items delivered thereto. Each of the booths L is equipped with one or more of the drawers 44 to extend substantially across the width of the booth, so as to enable the collection of items discharged from any of the dispensing units as are positioned over a booth as the conveyor A advances.

As a means for preventing unauthorized operation of the dispensing units, the electric current actuating the solenoid magnet H controlled by the push button E through the switch I, is derived from key controlled independent sources of electric supplied to each of the booths L. This is accomplished by equipping each booth with a horizontally extending longitudinally curved trolley rail 46 charged by electric current from a source of electrical supply, such as a generator N, through a conductor $f$ fitted with a normally open key control switch P; the conductor $b$ leading from the switch element $a$ of each switch I connecting with a trolley wheel $g$ carried by the conveyor A and arranged to traverse the trolley rails 46 which collectively constitute a circular track concentric with the axis of the conveyor A and here shown as supported on the upper margins of the partitions 43.

Automatic means are provided for tabulating the items delivered from the dispensing unit controlled by delivery of the dispensed items as they leave the unit, for which purpose a tabulator actuator Q is mounted on the under side of the conveyor bed 20 in association with each of the dispensing units B, which actuator is designed to be set to register the price of the item delivered from its associated dispensing unit.

Each of the tabulating units Q is constructed and operated as illustrated in Figs. 8 to 16 inclusive and here depicted as embodying a housing 47 in which is mounted a normally stationary, horizontally extending, revoluble shaft 48, on which is fixedly mounted a series of parallel closely arranged discs 49 here shown as being four in number and collectively constituting a transmitting cylinder. Each of the discs 49 has on its perimeter a series of four equi-spaced radially protruding semi-circular cams 50, for effecting actuation of a depending oscillatory arm pivoted at 52 and having a roller 53 on its lower end bearing on the periphery of the disc under the urge of a spring 54, there being an arm 51 associated with each of the discs 49 for independent operation by the cams 50 on the several discs.

Associated with each of the arms 51 is a micro-switch R embodying a shell mounted within the housing 47 in which is mounted a movable contact element $h$ normally spaced from a contact member $i$. The contact element $h$ is fitted with a stem 55 the outer end of which abuts the adjacent arm 51 in such fashion that on swinging the arm 51 under the action of the cams 50 the contact element $h$ will make contact with the contact member $i$.

Electrical current is directed to the contact member $i$ of the several micro-switches R through a conductor $j$ leading from a source of electrical supply, such as a generator S, as particularly shown in Fig. 18. The contact elements $h$ are connected to independent conductors $k$ fitted with connector terminals $l$ for selective connection with any one of a series of wiper contacts $m$ arranged in a row, in spaced relation to each other, on an insulating bar $n$ carried on the exterior of one end of the housing 47 of the tabulator actuator Q, each of the wiper contacts $m$ being fitted with several connector elements $p$ adapted to be detachably engaged by the terminals $l$. As here shown the terminals $l$ constitute plugs, while the connector elements $p$ comprise sockets for the terminals $l$ to effect electrical connection between the conductors $k$ and the wiper contacts $m$.

The wiper contacts $m$ are arranged in such fashion that on rotation of the conveyor A the wipers will traverse groups of parallel, spaced apart contact bars $q$ of a distributor P mounted on each of the partitions 43. Connecting with each of the bars $q$ of each distributor P is a conductor $r$ which leads to a tabulating element $s$ in a tabulator U of conventional construction as particularly shown in Fig. 18. The tabulating element $s$ each embody a magnet coil $t$ one terminal of which connects with a conductor $r$ and the other of which connects with a conductor $u$ leading to ground, such that on closing the switch R a circuit will be completed from the generator S through the conductors $j$ and $k$, through the particular wiper $m$ connected to said conductor $k$, through the particular bar $q$ engaged by said wiper $m$ and through the conductor $r$ leading from such bar $q$ through the coil $t$ on the recording elements $s$ to thereby actuate the tabulator in the usual manner.

Fixedly mounted on the shaft 48 of each tabulator actuator Q is a circular disk 56 having four equi-spaced notches 57 on its periphery adapted to be engaged by one end of a rocker arm 58 pivoted at 59, the other end of which arm projects from the housing 47 and is engaged by a pull spring 60 normally urging the inner end of the rocker arm against the periphery of the disk 56. The rocker arm 58 when engaged with one of the notches 57 serves to hold the shaft 48 and the assemblage of discs 49 thereon against rotation.

Means are provided for actuating the arm 58 intermittently to free the disk 56 and thus permit rotation of the shaft 48 at intervals while the carriage A is advancing. This means embodies a cam-track 61 associated with each distributor T, which track extends from the leading end of the distributor T into the path of travel of the outer end of the rocker arm 58 such that when the rocker arm is engaged by the cam track its outer end will swing upwardly in opposition to the spring 60 so as to move the inner end of the rocker arm out of engagement with the disk 56. The cam track 61 is arranged and contoured to actuate the rocker arm 58 to effect release of the disk 56 and thereby permit rotation of the shaft 48 immediately after the wiper contacts $m$ are advanced by the carriage A into engagement with the contact bars $q$ of the distributor T, and to permit rotation of the shaft 48 during the period the wipers traverse the bars $q$ and then reengage the disk 56.

Th shaft 48 of the tabulator actuator Q has fixed thereon a gear wheel 64 meshing with a driving gear 65 revolubly mounted on a stud shaft 66 fixed on a wall of the housing 47, and revolubly mounted on the stud shaft 66 alongside the gear 65 is a ratchet wheel 67 the rotation of which is confined to one direction by a spring pressed pawl 68 riding in engagement with the teeth of the ratchet wheel. The gear 65 will be maintained stationary during the period shaft 48 is held against rotation by engagement of the rocker arm 58 with the disk 56.

Mounted between the gear wheel 65 and ratchet wheel 67 is a spiral spring 69 the outer end of which is connected to the gear wheel 65 and the inner end of which is connected to a hub 70 on the ratchet wheel 67. The spring 69 is designed to be wound on the hub 70 and placed under tension by rotation of the ratchet wheel while the gear wheel 65 is held against movement, so as to then exert a pull on the gear wheel 65 circumferentially thereof, such as to turn the wheel 65 a partial revolution on disengagement of the arm 58 from the disk 56 as will be later described.

Turning of the ratchet wheel to effect the winding of the spring 69 is effected by means of an oscillatory arm 71 pivoted on the stud shaft 66 and carrying a spring pressed pawl 72 engaged with the teeth of the ratchet wheel.

The arm 71 is normally maintained in a retracted position by a pull spring 73 and is actuated by means of an electro-magnet V in opposition to the spring 73 to advance the ratchet wheel 67 a partial revolution. The electro-magnet V is arranged to advance the arm 71 such distance as to turn the ratchet wheel 67 a step corresponding in length to that of the ratchet tooth. The ratchet wheel 67 is thus turned with a step or a step-by-step movement in effecting winding of the spring 69. This turning movement of the wheel 65 is limited by means of a stop pin 74 on and projecting from the rear face of the ratchet wheel 67 in association with a co-acting abutment 75 on the gear wheel 65 as shown in Fig. 12. On advancing the ratchet wheel 67 the stop pin 74 will move away from the abutment 75 by reason of the gear wheel 65 then being stationary, then subsequently, on the freeing of the gear wheel 65, the spiral spring 69 will advance the gear wheel until the abutment 75 strikes the stop pin thus bringing the gear wheel to rest and disposing the gear wheel and ratchet wheel in a succeeding abutting position spaced from the preceding starting position. At this moment the rocker arm 58 is actuated to re-engage the disk 56 to thereby hold the shaft 48 and gear 64—65 against rotation in readiness for a subsequent operation.

On turning the ratchet wheel 67 one or more steps the spiral spring 69 will exert a pull on both the gear wheel 65 and the hub 70 each of which are held stationary in opposition to such pull; gear wheel 65 being held by engagement of the rocker arm 68 with the disk 56 on the shaft 48 as before stated, and the ratchet wheel 67 being held against retrograde movement under the pull of the spring 69 by the pawl 68. The ratchet wheel being held by the pawl 68, unwinding of the spring 69, which occurs on release of the gear wheel 65 by disengagement of the rocker arm 68 from the disk 56, will exert a pull on the gear wheel 65 such as to turn the latter a partial revolution and thereby rotate the gear 64 and shaft 48 with the disks 49 and 56 thereon.

The magnet V embodies a coil $v$ one terminal of which as shown in Figs. 5 and 17, is grounded, while its other terminal connects with a conductor $w$ leading to a movable contact element $x$ of an electric switch W the other contact member $y$ of which connects with a conductor $z$ leading to the conductor $b$ connecting with the source of electric current supply N through the trolley wheel $g$ and bar 46. The contact element $x$ of the switch W is mounted on a movable arm 76 which projects into the chute M and extends into the path of travel of an item C being delivered through the chute whereby such item will act on the arm 76 to close the switch W and thereby energize the magnet V.

In order to effect proper timing of the operation of the mechanism of the tabulator actuator A, the above described parts thereof bear a certain co-relation, which as here shown is as follows: the gear wheels 64—65 have a ratio of one to four, the ratchet wheel 67 has sixteen teeth whereby turning of the ratchet wheel the length of a tooth thereof will condition the spring 69 to subsequently advance the gear wheel 65 one-sixteenth of a revolution to thereby rotate the gear 64 one-fourth of a revolution thus turning of the shaft 48 and the disks 56 and 47 one-fourth of a revolution. The disk 56 has four notches 57 spaced part forty-five degrees or one-fourth the length of the circumference thereof, and the disks 49 each have four cams 50 spaced apart forty-five degrees or one-fourth the circumference of the disks 49. The several disks 49 are arranged so that the cam 50 on adjacent disks will be spaced progressively relative to each other circumferentially of the disks, as illustrated schematically in Fig. 13, whereby, considering the disk assembly as a whole, a series of four groups of the cams are provided around the perimeter of the assembly. The circumferentially adjacent cams of each of said groups are spaced apart about twenty-one degrees and the adjacent groups are spaced apart relative to each other about twenty-seven degrees. By the above recited arrangement of the cams 50 rotation of the shaft 48 and disks 49 one-fourth revolution will cause the cams of any one of the groups to successively actuate the four switch operating arms 51. To this end the rollers 53 on the arms 51 are arranged to normally seat on the peripheries of their associated disks 49 intermediate adjacent of the recited groups of cams.

In the arrangement here shown as viewed in Fig. 8, the ratchet wheel 67 turns only counter-clockwise under the action of the magnet actuated arm 71. The gear wheel 65 also turns counter-clockwise under the urge of the spring 69 thus rotating the gear 64, shaft 48, disks 56 and 59 in clockwise direction. The disks 49 have the cams 50 arranged thereon as viewed in Figs. 9 and 13 so that the cam on the foremost disk will initially actuate its associated arm, followed successively by the cams on succeeding disks actuating their associated arms 51 in their order as indicated in Figs. 15–16 wherein quadrilateral portions of the disk 49 are indicated.

In Fig. 15, the parts are depicted schematically as being disposed in their static position preliminary to actuation of the arm 71 and ratchet wheel 67 to wind the spring 69, in which position the shaft 48 is held stationary by the rocker arm 58 thereby holding the gear wheel 65 against movement by reason of the gear 64 meshing therewith being fixed on the shaft 48. As here shown the several disks 49 are depicted as quadrants bearing collectively a group of the cams 50 as disposed in readiness to successively operate their associated arms 51 on freeing the shaft 48 and gear wheel 65 so that the wound spring may rotate the gear wheel 65 and shaft. In Fig. 16 the parts are shown as disposed when the gear wheel 65 and shaft 48 have been turned nearly an initial step by the spring 69, the view showing the cam 50 on the "plus" disk 49 as closing the switch controlled thereby.

In the arrangement shown the forwardmost disk is designed to register dollars, while the next operating disk registers tens, and the third disk registers cents, while the fourth disk is designed to actuate a totaling mechanism in the tabulator. The several disks are accordingly here designated by appropriate insignia to indicate units, tens, dollars and add. In practice the number of the disks 49 on the shaft 48 and their associated parts may be increased or diminished as occasion may require.

The several wiper contacts $m$ are numbered consecutively one, two, three, four, five, six, seven, eight, nine, naught and plus, as shown in Fig. 10, and the contact bars $q$ and the conductors $r$ leading therefrom connect with the appropriate magnet coil $t$ in the tabulator U for registering corresponding symbols in the latter.

The above recited structure is housed in a suitable roofed building 77 having a circular side wall 78 which extends around the conveyor A except for a segment thereof where the wall 78 opens to a vestibule 79 constituting a pedestrian shopping area. The wall 78 is spaced outwardly from the booths L sufficiently to afford an aisle or passageway interiorly of the wall 78 leading along the open ends of the booths L. Doorways 80 equipped with sliding doors are provided in the wall 78 opposite the booths L which doorways lead to defined radially extending car-ports 81, there being a doorway 80 and an individual car-port 81 opposite each booth L lying within the boundary of the wall 78, whereby a person or persons on parking a vehicle in a carport 81 may pass from the car-port through the opposed doorway and enter the opposite booth L.

The booths L opening to the vestibule 79 are available to pedestrians entering the vestibule, as from a street, through a checking-in passage 82 such pedestrian ordinarily leaving the vestibule through a checking-out passage 83.

The space surrounded by the annular conveyor constitutes a warehouse or storage area X where merchandise may be stored in readiness for transfer to the dispensers whereby the stock in the dispensers may be readily replenished as need be by stock clerks who by this arrangement work in the area X apart from the customer. Loading of the dispensers is ordinarily effected while the conveyor is in motion.

Manifestly the merchandise to be dispensed from the conveyor A may be delivered to the storage area X bounded by the conveyor in any suitable manner, but in order to avoid interruption of movement of the conveyor for such purpose, means are provided whereby such merchandise may be conveyed to the storage area while the conveyor is in motion. This means is here shown as embodying a tunnel Y leading from a receiving depot Z apart from the market structure to a point within the area Z, the tunnel leading beneath the conveyor A clear thereof and affording a passage through which goods may be transported in any suitable manner such as on wheeled trucks lowered into the tunnel from the depot Z by an elevator 84, and lifted to the area Z by an elevator 85.

The building 77 is equipped with offices 86 and 87 at opposite sides of the passages 82—83 respectively, each of which offices have a checking window 88—89 respectively opening to the adjacent passages where attendants check pedestrian customers in and out of the vestibule 79, and each of the offices have checking windows 90—91 respectively opening to the opposite sides of the building for use by attendants in checking vehicle borne customers in and out of the parking areas defined by the carports 81.

In the general operation of the invention, the conveyor A carrying the stocked dispensing units B is rotated continuously throughout shopping hours at a suitable speed so that the units B with their associated display cases J will advance successively past the shopping booths L where customers stationed in the booths effect operation of selected dispensing units B which deliver desired items to the customer.

Preliminary to setting the conveyor A in motion the price registering mechanism of each of the dispensing units B is set to register the price of the item to be dispensed by the unit on each operation thereof, which is accomplished by inserting the plugs $l$ into the sockets $p$ of certain of the wiper contacts $m$ according to the amount to be registered, whereby the selected several wiper contacts $m$ will be activated by the particular transmitting disks 49 required to effect recording of the determined amount, for example; if the price of an item to be dispensed by the unit B is one dollar and fifty-eight cents, the plug $l$ on the conductor $k$ leading from the switch R controlled by the leading disk 49, is inserted in one of the sockets $p$ on the wiper contact $m$ designated "1"; the plug $l$ on the conductor $k$ leading from the switch R controlled by the second disk 49 is inserted in one of the sockets $p$ on the wiper contact $m$ designated "5"; and the plug $l$ on the conductor $k$ leading from the switch R controlled by the third disk 49 is inserted in one of the sockets $p$ on the wiper contact $m$ designated "8," all as indicated in Fig. 18. The remaining plug $l$ on the conductor K leading from the switch R controlled by the fourth disk 49, is connected to a socket $p$ on the wiper $m$ designated with the plus or add sign. The tabulator actuator Q will then be set so that when it is operated it will actuate the tabulator to register the sum of one dollar and fifty-eight cents, and also will actuate the tabulator to add this amount to an amount previously recorded by any other tabulator actuator set in operation by the customer occupying the particular assigned booth.

In event a price to be registered contains duplicate numbers such as one dollar and eleven cents then the plugs $l$ of the conductors $k$ leading from the switches controlled by the first three disks 49 will be connected to the three sockets $p$ of the wiper contact $m$ designated "1." The multiple of sockets $p$ on each contact wiper $m$ permits the above setting as well as any other combination of three numbers.

In conducting the mart, an attendant assigns an incoming customer at a checking-in window 82 or 90 to a numbered vacant booth L, and supplies the customer with a special key for operating the particular switch P in the assigned booth. Pedestrian customers are directed to booths L in the vestibule 79 while a vehicle rider is assigned a booth L and its associated car-port 81 in which latter the vehicle may be parked during the shopping operation.

The customer on taking his place in the assigned booth closes the switch P therein by means of its associated key whereby electric current is directed to the particular trolley rail 46 associated with such switch and booth, from which rail electric current is directed through the trolley wheel $g$ to the open push button switch E controlling the dispensing units B being advanced by the conveyor over the then energized rail 46; the current also being directed through the rail 46 and wheel $g$ to the contact member $y$ of the open item controlled switches W as shown in Fig. 17. The customer then selects the desired item from the advancing display of merchandise exhibited in the display cases J, and on so doing depresses the push button E of the normally open switch $i$ associated with such display case, thereby directing electric current through the magnet H so as to energize the latter and thereby actuate the pawl 39 and set the associated dispensing unit B in operation to effect discharge therefrom of the selected item C, which item passes through the chute M and is delivered to the drawer 44.

The flow of electric current in actuating the dispensing unit B is illustrated in Fig. 17 and is as follows: on closing the switch P current flows from the source N through the conductor $f$, through the bar 46, trolley wheel $g$, conductor $b$, contacts $a$ and $c$ of the switch I, conductor $d$ through the solenoid H, thereby energizing the latter and causing it to actuate the ratchet pawl 39 to move the upper end thereof free of the engaged finger 37, and to swing the other end of the pawl into the path of travel of the succeeding finger 37; the sprocket chain 33 then moving under the weight imposed thereon by the items C such as to deliver the lowermost item C to discharge as before described. The lower end of the ratchet pawl 39 engages the oncoming finger 37 to hold the chain 33 stationary until the magnet H is de-energized by opening of the switch I which occurs on release of the push button E. When this takes place the spring 41 retracts the lower end of the ratchet pawl 39 out of engagement with the finger 37 and causes the upper end of the ratchet pawl to engage the then advancing finger, thereby conditioning the dispensing unit for another operation. Manifestly, selected items may be delivered to the shutes M from any number of the units B traversing the electrically charged bar 46 of each booth L and a plurality of the items contained in a particular dispensing unit may be dispensed while the conveyor is advancing the units past a booth by repeatedly actuating the dispensing mechanism of a particular unit by operating the push button E.

The items C passing through the chute M actuate the switch arm 76 to close the switch W thereby directing flow of current from the then charged conductor $z$ through the then connected contacts $x$—$y$, conductor $w$ and the coil $v$ of the magnet V of the tabulator actuator Q associated with the dispensing unit B from which the item C has just been discharged. Energizing of the magnet V occurs only during the period the item C is passing the switch arm 76 and terminates when the item clears the switch arm which then automatically swings to its circuit breaking position.

Energizing the magnet V actuates the arm 71 which in turn actuates the mechanism of the tabulator actuator Q as before described to condition the latter to operate the tabulator U to register the selling price of the dispensed items as particularly shown in Fig. 18. The tabulator actuator Q functions to transmit to the tabulator U only during the period when the wiper contacts $m$ are traversing the contact bars $q$ which occurs while an operated dispensing unit B is passing over the partition 43 between adjacent booths L. At this time the wiper contacts $m$ ride onto the contact bars $q$ is immediately followed by the outer end of the rock arm 58 onto the cam bar 61 to effect disengagement of the disk 56 and the parts of the actuator Q controlled thereby as previously described so that the price transmitting action through the wiper contacts $m$ and bars $q$ may then take place, and is immediately followed by release of the rocker arm 58 from the cam bar 61 to cause it to re-engage the disk 56. The tabulator is then conditioned for operation on actuating a dispensing unit B in a succeeding booth. It will now be seen that a customer in a booth L may effect dispensing of items C from any number of the units B as they are advanced by the conveyor across the booth, each operated unit and its associated tabulator actuator Q being conditioned and cleared for subsequent operation as it passes from one booth to another.

An individual tabulator U is provided for recording the amount of purchases made by a customer, such tabulators being arranged in the office 87 in charge of attendants to whom the customer on completion of the purchasing operator returns the key used to close the circuits of the assigned booth. On return of the key the attendant on referring to the corresponding tabulator determines the amount of the sale and charges the customer accordingly.

Pedestrian shoppers patronizing the market in the vestibule 79 on collecting the dispensed items from the chute M convey same to the check-out station 88 where the shopper makes payment for the items and then goes his way, while vehicle traveling shoppers who drive into the market car-ports through a vehicle check-in passage have their purchases checked and make payment therefor at the cashier's station 91. The key controlled switch P is of the type wherein on removing the key from the switch it will be restored to its normal open position.

The items C obtained by the customer and collected in a drawer 44 are removed and packaged in any suitable manner to be taken away by the customer or in some instances left for subsequent delivery.

From the foregoing it will be seen that each booth L constitutes an individual customer's station, that the conveyor A with a multiple of item dispensing units B thereon comprises a means for bringing articles of merchandise to customers occupying the stations, that the trolley rails 46, key controlled switch P, push button E and trolley wheels or rollers 45 with their electrical connections constitute independent manually controlled powered means at each station L for actuating the dispensing units B as they pass a station, and that the tabulator actuator Q and tabulator U with their electrical connections including the switch W all associated with each dispensing unit B comprises means whereby the purchase prices of the items delivered from the dispensing units will be tabulated under the control of the items being dispensed. It will also be seen that the assemblage of wiper contacts m and their associated groups of contact bars q together with the plugs l and sockets p constitute means whereby each tabulator actuator Q may be set to record various purchase prices within the range of the number of contacts m and contact bars q employed.

It will further be manifest that by the construction and arrangement set forth the specified objects and advantages of the invention will be accomplished.

While I have shown and described specific embodiments for carrying the invention into effect the invention is not limited to the use of such embodiments but embraces equivalents thereof coming within the meaning and scope of the appended claims.

I claim:
1. In a merchandising mart, embodying an endless conveyor, a support therefor, means for advancing said conveyor with a continuous motion, and a multiple of defined customers' stations arranged around and contiguous to said conveyor; a multiple of normally inactive article dispensing units carried on said conveyor and disposed side by side thereon, manually controlled means on said conveyor for independently actuating said units arranged for operation from each of said stations to dispense articles one at a time from selected of said units while said conveyor is in motion, and means for delivering articles dispensed from said units to the station from which a unit is operated while the actuated units are advancing with said conveyor.

2. The structure called for in claim 1 in which said manually controlled means embodies an electro-magnet associated with each of said units for controlling operation thereof, an independent electric circuit controlling each of said magnets, and an independent switch on said conveyor adjacent each of said units controlling each of said circuits.

3. The structure called for in claim 1 in which said manually controlled means embodies an electro-magnet associated with each of said units for controlling operation thereof, an independent electric circuit controlling each of said magnets, an independent switch on said conveyor adjacent each of said units controlling each of said circuits, and independent means at each station for supplying electrical current to said circuit only while its associated dispensing unit is advancing with said conveyor past a given station.

4. The structure called for in claim 1, together with a tabulator actuator mounted on said conveyor in association with each of said dispensing units, means controlled by articles being delivered from said dispensing units for operating said actuators, and a tabulator remote from said conveyor in association with and controlled by each of said tabulator actuators for tabulating the selling price of such articles.

5. The structure called for in claim 1, together with a tabulator actuator mounted on said conveyor in association with each of said dispensing units, means controlled by articles being delivered from said dispensing units for operating said actuators, and a tabulator remote from said conveyor in association with and controlled by each of said tabulator actuators for tabulating the selling price of such articles and adjustable means in said last named means for varying the selling price to be tabulated.

6. In a merchandising mart, a rotary endless horizontal conveyor, a support therefor, a multiple of defined customers' stations surrounding said conveyor contiguous thereto, a multiple of article dispensing units carried by said conveyor, independent manually controlled electrically operated means on said conveyor for actuating each of said units, and key controlled means for independently supplying electrical current to said means from each of said stations.

7. In a merchandising mart, a rotary endless horizontal conveyor, a support for said conveyor, a multiple of defined customers' stations surrounding said conveyor contiguous thereto, a multiple of article dispensing units on said conveyor, an electro-magnet on each of said units, means actuated by said magnet controlling operation of its associated dispensing unit, an independent electric circuit on said conveyor connected to said magnet, a normally open manually controlled switch in said circuit, an independent trolley-rail at each of said stations, individual switch controlled means for energizing each of said trolley-rails, and a trolley-wheel associated with each of said independent electric circuits electrically connected to said normally open switch.

8. In a merchandising mart, a rotary endless horizontal conveyor, a support for said conveyor, a multiple of defined customers' stations surrounding said conveyor contiguous thereto, a multiple of article dispensing units on said conveyor, an electro-magnet on each of said units, means actuated by said magnet controlling operation of its associated dispensing unit, an independent electric circuit on said conveyor connected to said magnet, a normally open manually controlled switch in said circuit, an independent trolley-rail at each of said stations, a normally open individual key controlled switch at each of said stations connected to a source of electric current supply and to the trolley-rail at such station, and means associated with each of said independent electric circuits and with said normally open switch adapted to electrically connect said trolley-rail to said last named switch while it is advancing with said conveyor past a station.

9. In a merchandising mart, embodying a rotary annular conveyor, a mounting therefor, a multiple of dispensing units on said conveyor, means for continuously advancing said conveyor, and manually controlled means for selectively actuating said dispensing units to deliver articles therefrom one at a time; a multiple of tabulators apart from said carriage, one for each of said dispensing units, a tabulator actuator on said conveyor adjacent each of said dispensing units in association therewith, means on said carriage controlled by the articles delivered from a dispensing unit for conditioning the associated of said actuators for subsequent operation, and means traversed at intervals by said actuators as said conveyor advances for transmitting the prices of said articles to be recorded in said tabulators.

10. The structure called for in claim 9 together with selective means incorporated with each of said tabulator actuators for varying the prices to be transmitted thereby.

11. In a merchandising mart, embodying a rotary annular conveyor, a mounting therefor, a multiple of dispensing units on said conveyor, means for continuously advancing said conveyor, and manually controlled means for selectively actuating said dispensing units to deliver articles therefrom one at a time; a multiple of tabulators apart from said carriage, one for each of said dispensing units, a tabulator actuator on said carriage adjacent each of said dispensing units in association therewith, means on said carriage controlled by the articles delivered from a dispensing unit for conditioning the associated of said actuator for subsequent operation, a series of wiper contacts associated with each of said actuators, a plurality of electrical conductors leading from said actuator adapted to be connected to selected of said wiper contacts, means embodied in said actuator conditioning means for directing electrical current to said conductors, and a multiple of transmitting means at spaced intervals in the path of said wiper contacts as the conveyor advances and electrically connected to said tabulators for actuating the tabulators to record the price of articles delivered from said dispensing units.

12. In a merchandising mart, an annular rotary conveyor having an outer margin, a multiple of dispensing units on said conveyor, means on said conveyor for actuating said units manually controlled from the outer margin of said conveyor while the conveyor is advancing to discharge articles from said units, means for delivering discharged articles to adjacent the outer margin of the conveyor, and means for tabulating the prices of discharged articles remote from the conveyor controlled by the articles as they are being delivered.

13. In a merchandising mart embodying a horizontal endless conveyor, a support therefor, means for advancing said conveyor, and a multiple of defined customers' stations arranged around and contiguous to said conveyor; a multiple of normally inactive dispensing units mounted on and affixed to said conveyor and arranged side by side thereon, said units being moveable by said conveyor successively past each of said customers' stations, an electro-magnet associated with each of said units for effecting operation thereof said magnet having a pair of terminals one of which is grounded, a series of normally open manually controlled switches mounted on said conveyor, there being one of said switches adjacent each of said units having a pair of contacts, an electrical conductor leading from one of said contacts to the other terminal of said magnet, a source of electrical current supply in each of said stations, an independent electrical conductive means for directing electrical current from said source of supply to the other contact of each of said switches while it is being advanced by said conveyor past a given station, and a make and break switch in said electrical conductive means at each of said stations.

14. The structure called for in claim 13 wherein said make and break switch is key controlled.

15. The structure called for in claim 13 wherein said electrical conductive means is adapted when said make and break switch is closed to direct electrical current to each and all of the manually controlled switches being advanced opposite a station.

16. The structure called for in claim 13 wherein said electrical conductive means is adapted when said make and break switch is closed to direct electrical current to each and all of the manually controlled switches being advanced opposite a station, and means for breaking the flow of electrical current to said manually controlled switches as they are successively advanced by said conveyor from opposite a station to opposite an adjacent station.

17. The structure called for in claim 13 together with an electrically operated tabulator associated with each of said customers' stations, but remote therefrom, a second electro-magnet associated with each of said units, an independent normally open switch controlling the flow of electrical current to each of said second electro-magnets, means for closing said last named switch by articles dispensed from its associated unit to thereby energize said second electro-magnet, and means controlled by said second electro-magnet for actuating said tabulator.

References Cited in the file of this patent
UNITED STATES PATENTS

| | | |
|---|---|---|
| 1,381,202 | King | June 14, 1921 |
| 1,843,280 | Hall | Feb. 2, 1932 |
| 2,304,455 | Guerard | Dec. 8, 1942 |
| 2,679,354 | Skillman | May 25, 1954 |